(12) United States Patent
Roth (10) Patent No.: US 9,526,386 B2
(45) Date of Patent: Dec. 27, 2016

(54) VACUUM CLEANER, PARTICULARLY WET VACUUM CLEANER, AND DEVICE FOR DISCHARGING STATIC CHARGE, PARTICULARLY FOR USE IN VACUUM CLEANERS

(71) Applicant: PROAIR GmbH Gerätebau, Argenbühl-Eglofs (DE)

(72) Inventor: Paul Roth, Isny (DE)

(73) Assignee: PROAIR GmbH Gerätebau, Argenbühl-Eglofs (DE)

( * ) Notice: Subject to any disclaimer, the term of this patent is extended or adjusted under 35 U.S.C. 154(b) by 0 days.

(21) Appl. No.: 14/621,548

(22) Filed: Feb. 13, 2015

(65) Prior Publication Data
US 2015/0297046 A1 Oct. 22, 2015

(30) Foreign Application Priority Data

Feb. 14, 2014 (DE) .................. 10 2014 002 185

(51) Int. Cl.
| *A47L 7/00* | (2006.01) |
| *A47L 9/28* | (2006.01) |
| *H02J 7/34* | (2006.01) |
| *H05F 3/04* | (2006.01) |
| *A47L 5/00* | (2006.01) |
| *A47L 9/24* | (2006.01) |
| *H02J 7/00* | (2006.01) |

(52) U.S. Cl.
CPC ............... *A47L 7/0004* (2013.01); *A47L 5/00* (2013.01); *A47L 9/242* (2013.01); *A47L 9/28* (2013.01); *A47L 9/2889* (2013.01); *H02J 7/0068* (2013.01); *H02J 7/345* (2013.01); *H05F 3/04* (2013.01)

(58) Field of Classification Search
CPC ...... A47L 7/0004; A47L 9/2889; A47L 9/242; H02J 7/0068; H02J 7/345; H05F 3/04
See application file for complete search history.

(56) References Cited

U.S. PATENT DOCUMENTS

| 3,711,742 A | 1/1973 | Pinkham, Jr. | |
| 4,715,086 A * | 12/1987 | Johanson | A47L 9/2889 15/339 |
| 4,817,234 A * | 4/1989 | Greulich | A47L 9/2805 15/339 |

(Continued)

FOREIGN PATENT DOCUMENTS

| DE | 103 07 900 A1 | 9/2004 |
| KR | 20010054142 A | 7/2001 |

(Continued)

*Primary Examiner* — Dung Van Nguyen
(74) *Attorney, Agent, or Firm* — Gudrun E. Huckett (57) ABSTRACT

A vacuum cleaner of protection class II is provided with a connection for a suction hose; a drive motor; at least one electrically non-conductive part; a feed line configured to feed static voltage; and a capacitor device provided with a capacitor group with at least one capacitor. For discharging static voltage, the electrically non-conductive part is electrically conductively connected via at least one contact element to the capacitor device. The feed line is connected to the at least one capacitor. The at least one capacitor outputs the voltage to an electrical power network when a certain charge quantity is exceeded. The at least one contact element can be the motor shaft of the drive motor.

23 Claims, 4 Drawing Sheets

(56) References Cited

U.S. PATENT DOCUMENTS

| | | | | |
|---|---|---|---|---|
| 4,866,565 A | * | 9/1989 | Wray, Jr. .................. | A47L 9/24 15/339 |
| 4,958,255 A | * | 9/1990 | Pritchard ................. | H05F 3/02 361/212 |
| 5,150,499 A | * | 9/1992 | Berfield .................... | A47L 9/24 15/327.1 |
| 6,301,743 B1 | * | 10/2001 | Cloud, III ............. | A47L 9/2842 15/339 |

FOREIGN PATENT DOCUMENTS

| | | |
|---|---|---|
| WO | 2006/015914 A1 | 2/2006 |
| WO | 2006/117209 A1 | 11/2006 |
| WO | 2009/091076 A1 | 7/2009 |

\* cited by examiner

VACUUM CLEANER, PARTICULARLY WET VACUUM CLEANER, AND DEVICE FOR DISCHARGING STATIC CHARGE, PARTICULARLY FOR USE IN VACUUM CLEANERS

BACKGROUND OF THE INVENTION

The invention relates to a vacuum cleaner, particularly a wet vacuum cleaner, of protection class II, with a connection for a suction hose, with a drive motor and with at least one electrically non-conductive part. The invention also relates to a device for discharging static charge, particularly for use in vacuum cleaners, preferably in wet vacuum cleaners.

During vacuum cleaning, the air-conducting parts, such as the vacuum hose, the vacuum brush, the collection container for the dust and the like, are statically charged. The charging may lead to unpleasant electric shocks. In many vacuum cleaners, electronic controls, which have microprocessors, are used for speed regulation. Due to the high static voltage, voltage flashovers onto the microprocessors and therefore malfunctions and also damage to the electronic control can occur.

The static charge in devices of protection class I is usually discharged via the power cable to the protective earth. In currently conventional appliances in protection class II, a protective earth is not present. For this reason, the static charge cannot be dissipated if the appliance is used on an insulating floor, such as on wood, carpet, laminate, and the like.

The invention is based on the object of constructing the vacuum cleaner of the aforementioned kind and the device of the aforementioned kind in such a manner that even in the case of devices of protection class II, a reliable discharging of the static charge is ensured.

SUMMARY OF THE INVENTION

This object is achieved in accordance with the invention for vacuum cleaners of the aforementioned kind in that, for discharging static voltage, the electrically non-conductive part is electrically conductively connected via at least one contact element to a capacitor device, which has a capacitor group with at least one capacitor, which is connected to a feed line for feeding in the static voltage and outputs the voltage to the electrical power network when a certain charge quantity is exceeded.

The object is further solved in accordance with the invention for the device of the aforementioned kind in that the capacitor device has a capacitor group with at least one capacitor, and in that the capacitor group has a connection for feeding in the static voltage and a connection for discharging the stored charge to the power network.

The vacuum cleaner according to the invention is provided with the capacitor group, which has at least one capacitor. It is connected to a feed line for feeding in the static voltage and outputs the voltage to the electric power network if a certain charge quantity is exceeded. The static charge forming on the electrically non-conductive part of the vacuum cleaner is fed via the contact element to the capacitor group. The connection to the capacitor group is constructed in such a manner that the operator of the vacuum cleaner cannot touch the contact element or the capacitor group. The vacuum cleaner itself fulfils the requirements according to protection class II, the device for discharging the static voltage ensuring that voltage flashovers do not occur, so that the sensitive electronics in the vacuum cleaners are optimally protected from such voltage flashovers.

In the case of a wet vacuum cleaner, the contact element is preferably the motor shaft of the drive motor. In a wet vacuum cleaner, the separation of the sucked-up dirt from the air takes place in water. During vacuuming, this water is swirled, so that water constantly comes into contact with the motor shaft. As a result, the static charge that is forming, for example has formed at the vacuum hose, can be discharged via the motor shaft to the capacitor group.

In a preferred embodiment, the capacitor group has two capacitors connected in series to the motor shaft, which are connected to a phase line and to a neutral line.

The electrical connection to the capacitor group takes place via the central connection. Depending on the phase charge, the discharging either takes place via the phase line or via the neutral line.

The capacitors are advantageously X and/or Y capacitors, which offer optimal safety against voltage flashovers.

In an advantageous and safe embodiment, the capacitor group has at least two subassemblies. They each have two parallel-connected capacitors. The one subassembly is connected to the phase line and the other subassembly is connected to the neutral line.

In a preferred embodiment, a gas discharge lamp is located in the feed line feeding the charge. As soon as a static voltage higher than the ignition voltage of this gas discharge lamp arises, the gas discharge lamp ignites and forwards the applied high voltage to the capacitor group. In addition, the use of the gas discharge lamp has the advantage that the user of the vacuum cleaner can optically detect when a high static charge arises.

To increase the operational safety, at least one resistor is located between the gas discharge lamp and the capacitor group in the feed line.

Preferably, the gas discharge lamp is a glow lamp.

In a further preferred embodiment, at least one resistor is connected upstream of the capacitor group. The resistor is high-ohmic and ensures that a safe discharging of the high static voltage certainly takes place. In order to increase the safety, two resistors lying in series are connected upstream of the capacitor group.

Advantageously, the feed line, which is connected to the central connection of the capacitor group, is electrically conductively connected to the motor shaft. The discharging of the high static voltage therefore takes place via the motor shaft of the vacuum cleaner. The feed line is here resiliently pressed onto the upper end of the motor shaft by means of at least one spring element. As a result, a secure contact between the motor shaft and the feed line is ensured.

The spring element advantageously bears against a contact sphere, which is electrically conductively connected to the motor shaft. As a consequence of its approximately punctiform contact with the spring element, the contact sphere ensures that the spring element is only subject to a slight wearing even in the case of the motor shaft, which generally rotates at high speed.

The contact sphere is advantageously mounted in a depression in the upper end face of the motor shaft. In this case, the contact sphere protrudes out of the depression, in order to ensure the contacting with the spring element.

In a different advantageous embodiment, the spring element resiliently bears against a contact pin, which axially protrudes beyond the motor shaft and is electrically conductively connected to the same. Like the contact sphere, the contact pin is an inexpensive component, which can additionally be provided on the motor shaft.

In a further advantageous embodiment, the spring element is provided with a spring wire, which engages by means of its free end under spring force into a centring hole in the end face of the motor shaft. A secure contact between the spring element and the motor shaft results from this also.

In the event that the spring wire is for example carried along by the motor shaft when starting up the motor, the spring wire is advantageously connected to a wire coil section that surrounds the motor shaft with spacing. In this case, it ensures that a high restoring force acts on the spring wire, so that the arresting between the spring wire and the motor shaft is overcome. The motor shaft then rotates relatively to the spring wire, which reliably removes the static voltage arising from the motor shaft and forwards the same in the direction towards the capacitor group.

In a different advantageous embodiment, the upper end of the motor shaft is of convex construction. In this case, no special contact part, which would need to be fastened on the motor shaft, is necessary.

The contact element may be a contact plate or else a contact strip in an advantageous embodiment. The contact plate and the contact strip are fastened on the electrically non-conductive part of the vacuum cleaner. The contact plate or the contact strip then forward the static voltage to the capacitor group. Such a construction is exceptionally usable in vacuum cleaners, in which the dust separation does not take place using liquid, but rather with the aid of dust filter bags. The contact plate or the contact strip can however also be used in a wet vacuum cleaner. It is particularly advantageous if the contact plate or the contact strip in this case is additionally provided for discharging the static charge via the motor shaft.

The capacitor device according to the invention is wherein, in spite of a simple configuration, it ensures a safe discharging of static voltages, particularly of high static voltages. The capacitor of the capacitor group forwards the high static voltage as soon as a certain charge quantity has been reached.

Advantageously, the capacitor group is provided with two capacitors, which are connected to a phase line and to a neutral line. Depending on the phase charge, the discharging either takes place via the phase or via the neutral conductor.

In a different advantageous embodiment, the capacitor group has at least two subassemblies, which are provided with two parallel-connected capacitors in each case. The one subassembly can be connected to the phase line and the other subassembly is connected to the neutral line.

The subject of the application emerges not only from the subject of the individual claims, but also through all of the details and features disclosed in the drawings and the description. They are also claimed as important for the invention, even if they are not the subject of the claims, insofar as they are novel individually or in combination compared to the prior art.

Further features of the invention emerge from the further claims, the description and the drawings.

BRIEF DESCRIPTION OF THE DRAWINGS

The invention is explained in more detail on the basis of two embodiments illustrated in the drawings.

DESCRIPTION OF PREFERRED EMBODIMENTS

Figure 1:
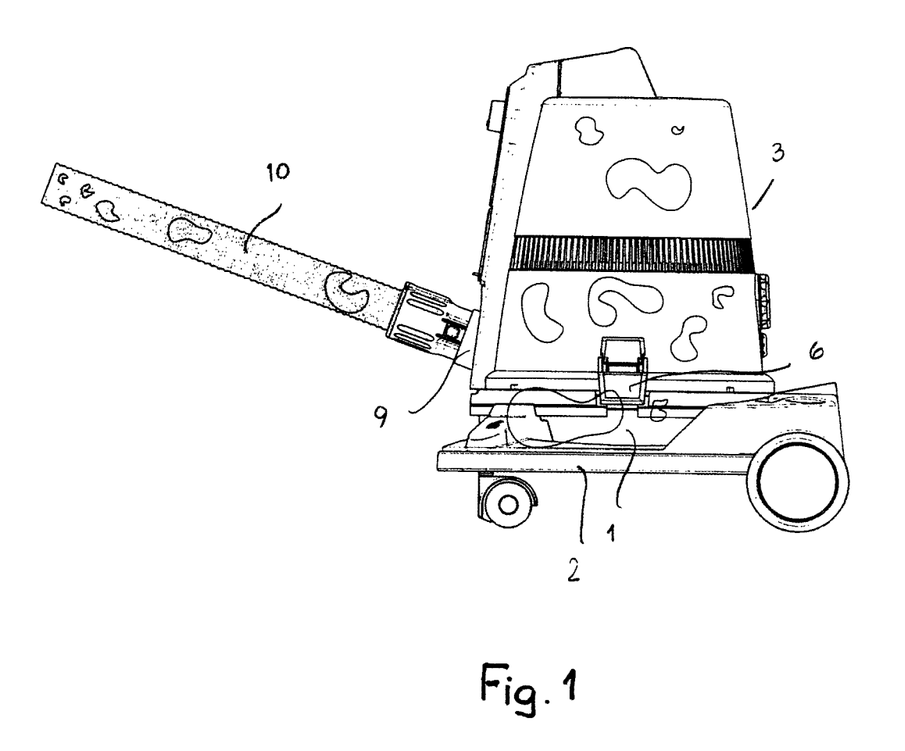
FIG. 1 shows a vacuum cleaner according to the invention in a schematic illustration.

The vacuum cleaner is an appliance of protection class II without a protective earth connection and advantageously a wet vacuum cleaner and has a receptacle 1 for a cleaning liquid, which is preferably water. The receptacle 1 is located on an undercarriage 2, using which the vacuum cleaner can be moved. A motor housing 3, which is releasably connected to the receptacle 1, is placed onto the receptacle 1. An electric motor 4 is located in the motor housing 3, using which a motor shaft 5 can be driven rotatably. The separator 6 has a wall 7 running conically in the direction of its lower end, in which slots 8 running in the height direction are located, through which the sucked-in air flows inwards.

The wet vacuum cleaner has a connection 9 for a vacuum hose 10, by means of which the air to be cleaned is sucked in with the dirt particles. It makes it into the liquid located in the receptacle 1, in which the coarse dirt particles are retained. The air with the dirt particles still contained therein is sucked in by means of the separator 6 rotating at high speed. The dirt particles ricochet at the lamellae 11 of the rapidly rotating separator 6 separating the slots 8 from one another and fall back into the liquid, whilst the cleaned suction air flows through the motor and exits from the motor housing 3 in a known manner.

Figure 2:
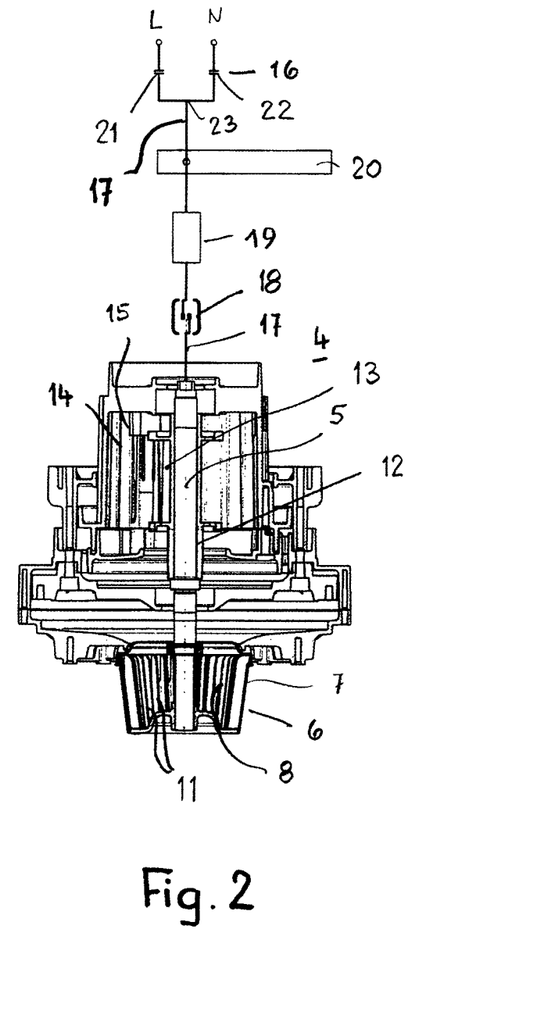
FIG. 2 shows a section through a motor of the vacuum cleaner according to FIG. 1.

The motor shaft 5 is rotatably mounted in an electrically insulating support tube 12. The motor shaft 5 is a constituent of a rotor 13, which is provided with permanent magnets and surrounded by a stator 14.

The motor shaft 5 protrudes downwards beyond the stator 14 and the rotor 13 and carries the separator 6, which is advantageously pushed onto the lower motor shaft end and releasably connected to the same. The upper and the lower end of the motor shaft 5 are exposed.

During vacuum cleaning, the air-conducting parts consisting of electrically non-conductive material, particularly of plastic, such as the vacuum hose 10 or the vacuum brush are statically charged. As, in a wet vacuum cleaner, the water, which is used to carry out the dust separation, forms a good electrical conductor, the static charge is discharged well by means of a suitable apparatus. The separator 6, which is located at a distance above the water in the receptacle 1, rotates at high speed about the axis thereof. As a result, the water is strongly swirled, as a result of which water reaches the lower, exposed end of the motor shaft 5. It is electrically conductively connected to a capacitor group 16, which reliably dissipates the static charge arising during the operation of the wet vacuum cleaner and supplied via the spray water and the motor shaft 5. A discharge or feed line 17 is connected to the upper end of the motor shaft 5, in which a gas discharge lamp 18 and a downstream-connected series resistor 19 are located. Between the series resistor 19 and the capacitor group 16, a contact plate 20 is connected to the discharge or feed line 17, which contact plate is connected to an electrically non-conductive vacuum part.

The capacitor group 16 has two x and/or y capacitors 21, 22, which are connected parallel to the motor shaft 5. The capacitor 21 is located in the phase line L and the capacitor 22 is located in the neutral line N. The connection to the discharge or feed line 17 or the discharge action of the high static voltage takes place via a central connection 23.

A glow lamp is advantageously used as a gas discharge lamp 18. In the exemplary embodiment, it has an ignition voltage of approximately 60 volts. In the de-energised state, the electric motor 4 is isolated from the capacitor group 16, via which the static charge is discharged into the mains network.

When the static charge of the air-conducting parts leads to a static voltage which is larger than the ignition voltage of the gas discharge lamp 18, this gas discharge lamp 18 ignites and forwards the applied high voltage to the capacitor group 16. Discharging to the electrical network takes place via the capacitor group 16.

The use of the gas discharge lamp 18 has the advantage that the user of the vacuum cleaner can detect by the illumination of the gas discharge lamp 18 that the high static voltage is currently being discharged from the appliance.

Figure 3:
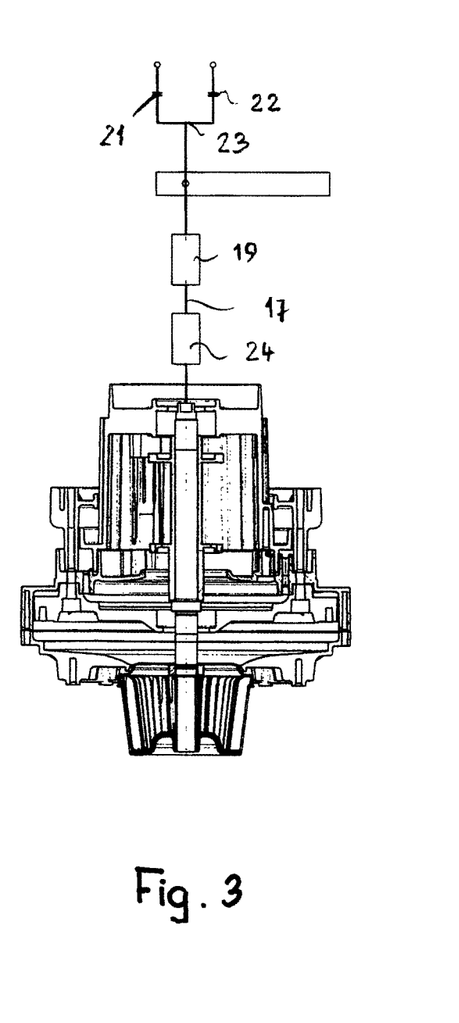
FIG. 3 shows a second embodiment of a motor of the vacuum cleaner according to the invention in an illustration corresponding to FIG. 2.

FIG. 3 shows a different embodiment of discharging of the high static voltage. Instead of the gas discharge lamp 18, a further series resistor 24 is located in the discharge or feed line 17. Aside from that, the discharge circuit is constructed in the same manner as that in the previous embodiment. The two series resistors 19, 24 lie in series and form a high-ohmic resistance, by means of which the high static voltage is discharged to the central connection 23 of the capacitors 21, 22. The use of two series resistors 19, 24 connected in series increases the safety, should one of the resistors be damaged or destroyed. A high-ohmic resistor 19 or 24 is sufficient for discharging the high static voltage. For safety reasons, it must however be constructed in such a manner that it cannot become low-ohmic if destroyed.

The capacitors 21, 22, which are connected in series to the motor shaft 5, initially store the static voltage. As soon as a charge quantity determined by the capacitors 21, 22 is reached, voltage is discharged into the power network. The central connection 23 is connected to the statically charged parts of the vacuum cleaner in such a manner that the operator of the vacuum cleaner cannot touch the electrical connection parts. The discharge circuit is illustrated in FIGS. 2 and 3 outside of the motor, solely for reasons of clarity. In practice, it is located inside the motor housing 3. As soon as the high static voltage fed to the central connection 23 increases above the voltage of this central connection, discharging into the electrical network takes place via the capacitor 21, i.e., via the phase L, or via the capacitor 22, i.e., via the neutral conductor N, depending on the phase charge.

The contact plate 20 discharges the static charge additionally from the electrically non-conductive vacuum cleaner parts via the discharge or feed line 17 to the central connection 23 of the capacitor group 16.

Figure 4:
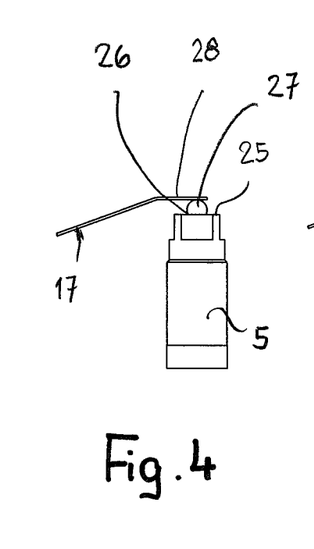
FIG. 4 shows an embodiment of the connection of a discharge or feed line to a motor shaft of the vacuum cleaner according to the invention.
Figure 5:
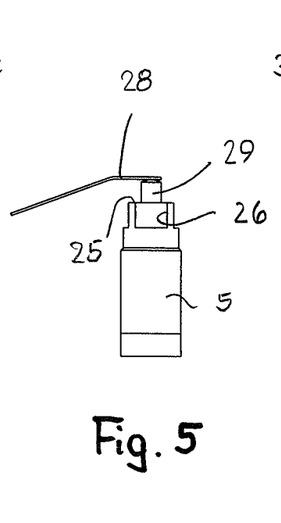
FIG. 5 shows another embodiment of the connection of a discharge or feed line to a motor shaft of the vacuum cleaner according to the invention.
Figure 6:
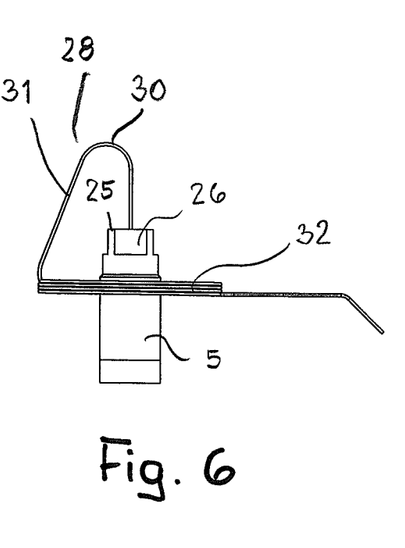
FIG. 6 shows yet another embodiment of the connection of a discharge or feed line to a motor shaft of the vacuum cleaner according to the invention.

FIGS. 4 to 6 show possible connections of the discharge or feed line 17 to the motor shaft 5. As it rotates about its axis during the operation of the vacuum cleaner, the connection of the discharge or feed line 17 is constructed in such a manner that in spite of the rotation of the motor shaft 5, a secure and low-wearing contact with the discharge or feed line 17 is ensured.

In the exemplary embodiment according to FIG. 4, a depression 26 is provided in the end face 25 of the motor shaft 5, which depression accommodates a contact sphere 27. It consists of electrically conductive material. A spring element 28 bears against the same under pressure. A spring plate, which bears under elastic prestress on the contact sphere 27, is advantageously connected to the discharge or feed line 17, for example soldered. As a consequence of its spherical shape, the contact sphere 27 ensures that there is approximately only point contact between the spring element 28 and the contact sphere, as a result of which the friction can be kept small. As a consequence of the resilient construction of the spring element 28, it is additionally ensured that even after relatively long use of the vacuum cleaner, a reliable contact between the spring element 28 and the contact sphere 27 is ensured.

In the embodiment according to FIG. 5, the spring element 28 is in electrically conductive contact with a contact pin 29 fastened into the depression 26 at the upper end of the motor shaft 5. The contact pin 29 axially protrudes beyond the upper end face 25 of the motor shaft 5. The spring element 28 bears under elastic prestress against the end face of the contact pin 29. In order to keep the contact friction as small as possible, the contact pin 29 only has a small diameter, which is advantageously smaller than the diameter of the depression 26.

In the embodiment according to FIG. 6, a prestressed spring wire 30 of the spring element 28 protrudes into the depression 26 of the motor shaft 5. The spring wire 30 protrudes with its end into a centring hole provided in the bottom of the depression 26, it being ensured by the elastic prestress that the spring wire 30 does not come out of contact with the motor shaft 5 in the case of rotating motor shaft 5. The spring wire 30 initially axially protrudes beyond the upper end face 25 of the motor shaft and merges with spacing from the end face 25 into an intermediate section 31 in an arc-shaped manner, which connects the spring wire 30 to a coil section 32. It surrounds the motor shaft 5 with radial spacing. The coil section 32 ensures that the electrically conductive contact between the spring wire 30 and the motor shaft 5 is even ensured when the spring wire 30 should briefly get caught on the motor shaft 5. In such a case, the coil section 32 is elastically deformed in such a manner that a force acting counter to the rotational direction of the motor shaft 5 acts on the spring wire 30, which force is so large that the spring wire 30 disengages again.

The discharge or feed line 17 is electrically conductively connected to the spring wire 30 in a suitable manner, as in the preceding exemplary embodiments.

The motor shaft 5 must not have an end-face depression. The contact sphere 27, the contact pin 29, and the centring hole can also be provided on the planar end face 25 of the motor shaft 5.

In a further embodiment (not illustrated), the upper end of the motor shaft 5 is of convex construction. In this case, no additional contact part, which must be connected to the motor shaft 5, is required. The spring element 28 bears on the convex end of the motor shaft in a virtually punctiform manner, so that only a slight friction arises during operation of the vacuum cleaner.

Whilst in the described exemplary embodiment of a wet vacuum cleaner the static discharge is supplied via the motor shaft 5 to the capacitor group 16, the contact plate 20 is used for discharging the static charge to the capacitor group 16 in a vacuum cleaner operating with a dust filter bag. The contact plate 20 is fastened on an electrically non-conductive part of the vacuum cleaner, for example, the motor housing, which consists of plastic, and connected via the discharge or feed line 17 to the central connection 23 of the capacitor group 16 in the described manner. The discharge of the static charge takes place in the same manner as explained with the aid of FIGS. 1 to 6.

The use of the contact plate 20 in the wet vacuum cleaner according to the illustrated exemplary embodiment has the advantage that the static charge can be discharged not only via the motor shaft 5, but also via the contact plate 20 to the capacitor group 16. This results in increased safety.

Figure 7:
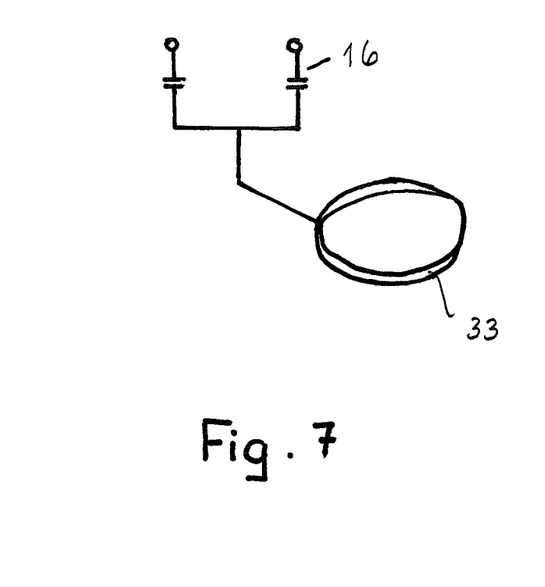
FIG. 7 shows a further embodiment of a discharging of static charge in the vacuum cleaner according to the invention in a schematic illustration.

FIG. 7 shows a further exemplary embodiment of how a static charge can be discharged to the capacitor group 16. A contact body 33 in the form of a wire, a metal strip or a metal foil, which can be fastened on the electrically non conductive part of the vacuum cleaner in a suitable manner, is provided for this. The contact body 33 is illustrated as a surrounding ring. It can however also have the shape of a partial ring or any other suitable shape. The contact body forwards the static charge formed at the vacuum cleaner part to the capacitor group 16. The discharging into the power network takes place in the described manner. The contact body 33 can advantageously be used in a vacuum cleaner, in which the dirt particles can be separated from the sucked-in air by means of a dust filter bag. It can however also additionally be provided in the illustrated wet vacuum cleaner described, in order to increase the safety during the discharging of the static charge. In this case, as in the embodiment according to FIGS. 1 to 6, the static charge is conducted via the motor shaft 5 and the contact body 33 to the capacitor group 16.

Figure 8:
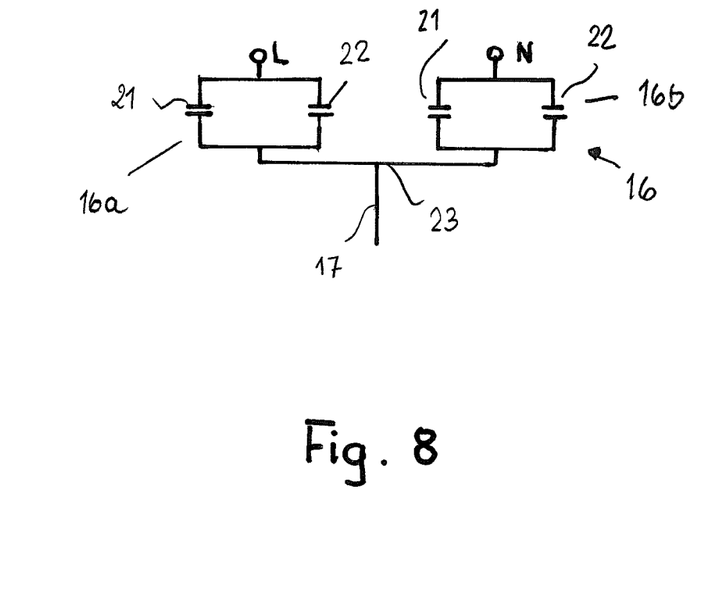
FIG. 8 shows a further embodiment of a discharge circuit.

FIG. 8 shows a further exemplary embodiment of the capacitor group 16. It has two subassemblies 16*a*, 16*b*, which are in each case provided with the capacitors 21, 22. The subassembly 16*a* is connected to the phase line L and the subassembly 16*b* is connected to the neutral line N. The capacitors 21, 22 are parallel-connected in both of the subassemblies 16*a*, 16*b*. In this circuit also, the high electric voltage is discharged from the discharge or feed line 17 via the central connection 23 to the capacitor group 16.

The specification incorporates by reference the entire disclosure of German priority patent application DE 10 2014 002 185.8 having a filing date of Feb. 14, 2014.

While specific embodiments of the invention have been shown and described in detail to illustrate the inventive principles, it will be understood that the invention may be embodied otherwise without departing from such principles.

What is claimed is:

1. A vacuum cleaner of protection class II, the vacuum cleaner comprising:
   a connection for a suction hose;
   a drive motor;
   at least one electrically non-conductive part;
   a feed line configured to feed static voltage;
   a capacitor device comprising a capacitor group with at least one capacitor;
   wherein, for discharging static voltage, the electrically non-conductive part is electrically conductively connected via at least one contact element to the capacitor device;
   wherein the feed line is connected to the at least one capacitor;
   wherein the at least one capacitor outputs the voltage to an electrical power network when a certain charge quantity is exceeded;
   wherein the at least one contact element is a motor shaft of the drive motor.

2. The vacuum cleaner according to claim 1, wherein the capacitor group comprises two of said at least one capacitor connected in series to the motor shaft and connected to a phase line and to a neutral line, respectively, wherein the feed line is connected to a central connection of the capacitor group.

3. The vacuum cleaner according to claim 2, wherein the two capacitors are X and/or Y capacitors.

4. A vacuum cleaner of protection class II, the vacuum cleaner comprising:
   a connection for a suction hose;
   a drive motor;
   at least one electrically non-conductive part;
   a feed line configured to feed static voltage;
   a capacitor device comprising a capacitor group with at least one capacitor;
   wherein, for discharging static voltage, the electrically non-conductive part is electrically conductively connected via at least one contact element to the capacitor device;
   wherein the feed line is connected to the at least one capacitor;
   wherein the at least one capacitor outputs the voltage to an electrical power network when a certain charge quantity is exceeded;
   wherein the capacitor group comprises at least two subassemblies each comprising two of said at least one capacitor connected in parallel, wherein a first one of said at least two subassemblies is connected to a phase line and a second one of said at least two subassemblies is connected to a neutral line.

5. The vacuum cleaner according to claim 4, wherein the at least one contact element is a contact plate or a contact strip.

6. A vacuum cleaner of protection class II, the vacuum cleaner comprising:
   a connection for a suction hose;
   a drive motor;
   at least one electrically non-conductive part;
   a feed line configured to feed static voltage;
   a capacitor device comprising a capacitor group with at least one capacitor;
   a gas discharge lamp connected within the feed line;
   wherein, for discharging static voltage, the electrically non-conductive part is electrically conductively connected via at least one contact element to the capacitor device;
   wherein the feed line is connected to the at least one capacitor;
   wherein the at least one capacitor outputs the voltage to an electrical power network when a certain charge quantity is exceeded.

7. The vacuum cleaner according to claim 6, further comprising at least one resistor connected within the feed line between the gas discharge lamp and the capacitor group.

8. The vacuum cleaner according to claim 6, wherein the gas discharge lamp is a glow lamp.

9. The vacuum cleaner according to claim 6, wherein the at least one contact element is a contact plate or a contact strip.

10. A vacuum cleaner of protection class II, the vacuum cleaner comprising:
    a connection for a suction hose;
    a drive motor;
    at least one electrically non-conductive part;

a feed line configured to feed static voltage;
a capacitor device comprising a capacitor group with at least one capacitor;
at least one resistor connected upstream of the capacitor group;
wherein, for discharging static voltage, the electrically non-conductive part is electrically conductively connected via at least one contact element to the capacitor device;
wherein the feed line is connected to the at least one capacitor;
wherein the at least one capacitor outputs the voltage to an electrical power network when a certain charge quantity is exceeded.

11. The vacuum cleaner according to claim 10, wherein the at least one contact element is a contact plate or a contact strip.

12. A vacuum cleaner of protection class II, the vacuum cleaner comprising:
a connection for a suction hose;
a drive motor;
at least one electrically non-conductive part;
a feed line configured to feed static voltage;
a capacitor device comprising a capacitor group with at least one capacitor;
two resistors connected in series upstream of the capacitor group;
wherein, for discharging static voltage, the electrically non-conductive part is electrically conductively connected via at least one contact element to the capacitor device;
wherein the feed line is connected to the at least one capacitor;
wherein the at least one capacitor outputs the voltage to an electrical power network when a certain charge quantity is exceeded.

13. The vacuum cleaner according to claim 12, wherein the at least one contact element is a contact plate or a contact strip.

14. A vacuum cleaner of protection class II, the vacuum cleaner comprising:
a connection for a suction hose;
a drive motor;
at least one electrically non-conductive part;
a feed line configured to feed static voltage;
a capacitor device comprising a capacitor group with at least one capacitor;
a spring element, wherein the feed line is resiliently pressed against an upper end of a motor shaft of the drive motor by the spring element;
wherein, for discharging static voltage, the electrically non-conductive part is electrically conductively connected via at least one contact element to the capacitor device;
wherein the feed line is connected to the at least one capacitor;
wherein the at least one capacitor outputs the voltage to an electrical power network when a certain charge quantity is exceeded.

15. The vacuum cleaner according to claim 14, further comprising a contact sphere electrically conductively connected to the motor shaft, wherein the spring element bears against the contact sphere.

16. The vacuum cleaner according to claim 15, wherein the contact sphere protrudes from a depression provided at an end face of the upper end of the motor shaft.

17. The vacuum cleaner according to claim 14, further comprising a contact pin axially protruding from the upper end of the motor shaft and electrically conductively connected to the motor shaft, wherein the spring element resiliently bears against the contact pin.

18. The vacuum cleaner according to claim 17, wherein the contact pin is fastened to a bottom of a depression provided at an end face of the upper end of the motor shaft.

19. The vacuum cleaner according to claim 14, wherein the spring element comprises a spring wire comprising a free end, wherein the free end of the spring wire engages under spring force a centring hole in an end face of the upper end of the motor shaft.

20. The vacuum cleaner according to claim 19, wherein the spring wire is connected to a coil section that surrounds the motor shaft at a spacing.

21. The vacuum cleaner according to claim 20, wherein the spring wire and the coil section are constructed as one piece.

22. The vacuum cleaner according to claim 14, wherein the upper end of the motor shaft is convex.

23. The vacuum cleaner according to claim 14, wherein the at least one contact element is a contact plate or a contact strip.

* * * * *